US010942035B2

(12) United States Patent
Aiuchi et al.

(10) Patent No.: US 10,942,035 B2
(45) Date of Patent: Mar. 9, 2021

(54) VEHICLE

(71) Applicant: SUBARU CORPORATION, Tokyo (JP)

(72) Inventors: Yuji Aiuchi, Tokyo (JP); Katsumi Kikuchi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 87 days.

(21) Appl. No.: 15/949,758

(22) Filed: Apr. 10, 2018

(65) Prior Publication Data
US 2018/0313654 A1 Nov. 1, 2018

(30) Foreign Application Priority Data

Apr. 28, 2017 (JP) .............................. JP2017-089162

(51) Int. Cl.
*G01C 21/34* (2006.01)
*B60N 2/24* (2006.01)
(Continued)

(52) U.S. Cl.
CPC .......... *G01C 21/3438* (2013.01); *B60N 2/01* (2013.01); *B60N 2/245* (2013.01); *G01C 21/3415* (2013.01); *G01C 21/3602* (2013.01)

(58) Field of Classification Search
CPC .......... G01C 21/3438; G01C 21/3602; G01C 21/3415; G01C 21/343; G01C 21/34; G01C 21/3484; G05D 1/021; G05D 1/0011; G05D 1/0061; B62B 5/0076; B62B 5/0003; B60N 2/002; B60N 2/01; B60N 2/245; B60N 2002/0272; B60N 2002/0268; B60N 2/06; B60N 2/14; B60N 2/42736; B60N 2002/0256; B60N 2/24; B60N 2002/0212;
(Continued)

(56) References Cited

U.S. PATENT DOCUMENTS 4,671,730 A * 6/1987 Gateau .................. B60P 1/4435
414/495
5,466,111 A * 11/1995 Meyer .................. A61G 5/1059
414/462
(Continued)

FOREIGN PATENT DOCUMENTS

EP          1 787 883 A1    5/2007
JP          2003-175080 A   6/2003
(Continued)

OTHER PUBLICATIONS

Japanese Office Action, dated Apr. 2, 2019, in Japanese Application No. 2017-089162 and English Translation thereof.

*Primary Examiner* — Angelina Shudy
*Assistant Examiner* — Mohamed Abdo Algehaim
(74) *Attorney, Agent, or Firm* — McGinn I.P. Law Group, PLLC.

(57) ABSTRACT

A vehicle includes an acquisition unit and a position determination unit. The acquisition unit is configured to acquire at least one of conditions including an order of getting out of the vehicle, a possibility of manual driving, and a combination of positions of sub-mobility devices in a vehicle compartment, and the position determination unit configured to determine the positions of the sub-mobility devices in the vehicle compartment, on a basis of a combination of the conditions.

20 Claims, 6 Drawing Sheets

(51) Int. Cl.
  *G01C 21/36* (2006.01)
  *B60N 2/01* (2006.01)
(58) Field of Classification Search
  CPC . B60N 2/02; B60N 2/286; B60N 2/85; B60N 2/0224; G06Q 10/02
  USPC ........ 701/36, 1, 49, 2; 296/65.04, 64, 65.12; 297/477
  See application file for complete search history.

(56) References Cited

U.S. PATENT DOCUMENTS

| | | | | |
|---|---|---|---|---|
| 5,746,465 | A * | 5/1998 | Jones | B60N 2/14 296/65.03 |
| 6,240,362 | B1 * | 5/2001 | Gaspard, II | G01C 21/343 340/991 |
| 6,241,308 | B1 * | 6/2001 | Gaspard, II | B60G 9/00 296/178 |
| 7,802,801 | B2 * | 9/2010 | Bartel | A61G 3/061 280/6.152 |
| 7,866,723 | B2 * | 1/2011 | Ninio | B60N 2/062 296/65.11 |
| 8,109,551 | B2 * | 2/2012 | Kerr | B62D 47/02 296/178 |
| 8,371,589 | B2 * | 2/2013 | Bartel | A61G 3/061 280/6.152 |
| 8,490,723 | B2 * | 7/2013 | Heinzmann | B62K 11/007 180/7.1 |
| 8,579,350 | B2 * | 11/2013 | Masters | A47C 9/06 296/64 |
| 8,807,575 | B2 * | 8/2014 | Bartel | A61G 3/061 280/6.152 |
| 9,862,290 | B2 * | 1/2018 | Yamada | B60N 2/012 |
| 10,363,178 | B2 * | 7/2019 | Garoosi | B60N 2/01508 |
| 2003/0044266 | A1 * | 3/2003 | Vandillen | A61G 3/061 414/537 |
| 2003/0106523 | A1 | 6/2003 | Uraki et al. | |
| 2004/0124655 | A1 * | 7/2004 | Takenoshita | B60N 2/245 296/65.13 |
| 2004/0256827 | A1 * | 12/2004 | Watters | A61G 3/061 280/124.1 |
| 2005/0218686 | A1 | 10/2005 | Takenoshita et al. | |
| 2008/0025829 | A1 * | 1/2008 | Denison | A61G 3/061 414/537 |
| 2009/0063208 | A1 * | 3/2009 | Stirlen | G06Q 10/02 705/6 |
| 2009/0085370 | A1 | 4/2009 | Bartel et al. | |
| 2009/0152907 | A1 * | 6/2009 | Lee | B60N 2/01 297/1 |
| 2011/0140499 | A1 * | 6/2011 | Masters | A47C 9/06 297/440.1 |
| 2011/0215620 | A1 * | 9/2011 | Cech | A47C 7/62 297/217.2 |
| 2013/0035846 | A1 * | 2/2013 | Shih-Chia | G06Q 10/06311 701/408 |
| 2013/0168165 | A1 * | 7/2013 | Bartel | A61G 3/061 180/41 |
| 2014/0042790 | A1 * | 2/2014 | Masters | A47C 9/06 297/440.1 |
| 2016/0046177 | A1 * | 2/2016 | Yamaguchi | B60J 5/101 296/146.8 |
| 2016/0310333 | A1 * | 10/2016 | Maeshiro | A61G 5/08 |
| 2017/0120776 | A1 * | 5/2017 | Slungare | B60N 2/14 |
| 2017/0200355 | A1 * | 7/2017 | Gruenbaum | H04B 5/0031 |
| 2018/0209803 | A1 * | 7/2018 | Rakah | G08G 1/202 |
| 2018/0271724 | A1 * | 9/2018 | Garoosi | A61G 3/0808 |
| 2018/0275648 | A1 * | 9/2018 | Ramalingam | G01C 21/3423 |
| 2019/0111806 | A1 * | 4/2019 | Camuti | B60N 2/01 |
| 2019/0164113 | A1 * | 5/2019 | Fosgard | G05D 1/0225 |
| 2020/0047641 | A1 * | 2/2020 | D'Eramo | A47C 3/04 |
| 2020/0070715 | A1 * | 3/2020 | Krause | B60Q 3/76 |
| 2020/0104770 | A1 * | 4/2020 | Aich | G06Q 30/0284 |
| 2020/0108744 | A1 * | 4/2020 | Shiga | B60N 2/3009 |

FOREIGN PATENT DOCUMENTS

| | | |
|---|---|---|
| JP | 2004-114956 A | 4/2004 |
| JP | 2005-050202 A | 2/2005 |
| JP | 2006-006702 A | 1/2006 |
| JP | 2006-285841 A | 10/2006 |
| JP | 2008-065773 A | 3/2008 |
| WO | WO 02/072383 A1 | 9/2002 |

* cited by examiner

VEHICLE

CROSS-REFERENCE TO RELATED APPLICATIONS

The present application claims priority from Japanese Patent Application No. 2017-089162 filed on Apr. 28, 2017, the entire contents of which are hereby incorporated by reference.

BACKGROUND

1. Technical Field

The present invention relates to a vehicle capable of moving while carrying sub-mobility devices in which passengers sit.

2. Related Art

Conventionally, wheelchairs have been used by elderly persons and handicapped persons who have difficulty walking by themselves. In recent years, a personal mobility device such as a wheel chair capable of automatically running by an electric motor and so forth is being proposed. To realize a society where this personal mobility device becomes widespread, and therefore people having difficulty walking by themselves are easy to live active lives, it is desired that the personal mobility device is used by not only people having difficulty walking by themselves but also people who can walk by themselves. Therefore, it is important that a personal mobility device can get in a vehicle such as an automobile while a passenger sits in the personal mobility device, as an example of wheelchair disclosed in, for example, Japanese Unexamined Patent Application Publications No. 2006-006702 and 2004-114956.

SUMMARY OF THE INVENTION

An aspect of the present invention provides a vehicle including: an acquisition unit configured to acquire at least one of conditions including an order of getting out of the vehicle, a possibility of manual driving, and a combination of positions of sub-mobility devices in a vehicle compartment; and a position determination unit configured to determine the positions of the sub-mobility devices in the vehicle compartment, on a basis of a combination of the conditions.

DETAILED DESCRIPTION

Figure 1:
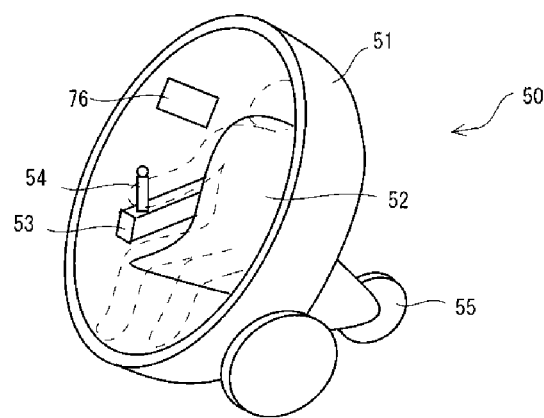
FIG. 1 is a schematic view illustrating an exemplary sub-mobility device applied to the present invention.

Hereinafter, examples of the present invention will be described with reference to the drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following examples which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid redundant description.

When one vehicle carries a plurality of sub-mobility devices and moves to a destination or a stop-off point near the destination, there may be an issue with the position of each of the sub-mobility devices in the vehicle. For example, the sub-mobility device located far from the exit cannot get out of the vehicle unless a way to the exit is made by moving the other sub-mobility devices, for example, by getting the other sub-mobility devices out of the vehicle. In addition, when a sub-mobility device whose passenger wants to drive the vehicle is located far from the driving position of the vehicle, the sub-mobility device cannot get to the driving position to drive the vehicle unless a way to the driving position is made by moving the other sub-mobility devices. Moreover, there may be a case where the passengers as members of a group want to get in the vehicle in the group. Furthermore, there may be a case where a passenger does not want to be seated next to an undesirable person.

It is desirable to provide a vehicle that can carry a plurality of sub-mobility devices and to appropriately adjust the positions of the plurality of sub-mobility devices in the vehicle.

Example 1

FIG. 1 is a schematic view illustrating an exemplary sub-mobility device 50 applied to the present invention. As illustrated in FIG. 1, the sub-mobility device 50 has an egg-shaped body 51. A seat 52 on which a passenger sits is disposed inside the body 51. Armrests 53 are disposed on the right and left sides of the seat 52. A control lever 54 is disposed in the front end of the armrest 53. In addition, a plurality of wheels 55 are provided on the lower part of the body 51.

Figure 2:
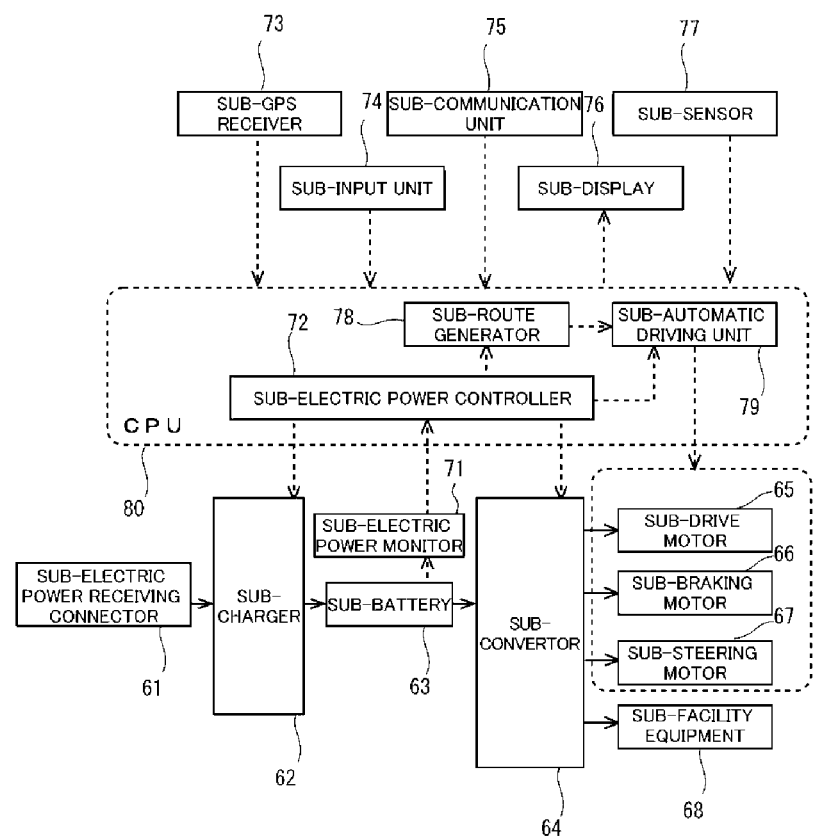
FIG. 2 illustrates an exemplary electric circuit of the sub-mobility device illustrated in FIG. 1.

FIG. 2 illustrates an exemplary electric circuit of the sub-mobility device 50 illustrated in FIG. 1. As illustrated in FIG. 2, the electric circuit of the sub-mobility device 50 includes an electric power system including a sub-electric power receiving connector 61, a sub-charger 62, a sub-battery 63, a sub-convertor 64, a sub-drive motor 65 for driving the plurality of wheels 65, a sub-braking motor 66, a sub-steering motor 67, and a sub-facility equipment 68.

The sub-electric power receiving connector 61 is coupled to, for example, a commercial electric power supply by a power cord. Electric power is supplied from the sub-electric power receiving connector 61 to the sub-charger 62, so that the sub-charger 62 charges the sub-battery 63. The sub-convertor 64 converts the electric power stored in the sub-battery 63, and supplies the converted electric power to loading devices such as the sub-drive motor 65, the sub-braking motor 66, the sub-steering motor 67, and the sub-facility equipment 68. The sub-drive motor 65 is driven to rotate the plurality of wheels 55, so that the sub-mobility device 50 can move forward or backward. The sub-steering motor 67 is driven to turn the wheels 55, so that the sub-mobility device 50 can turn to the right or the left. The sub-braking motor 66 is driven to stop the rotation of the plurality of wheels 55, so that the sub-mobility device 50 can be stopped. In this way, the sub-mobility device 50 can run carrying a passenger on the seat 52, by using the electric power stored in the sub-battery 63 charged by the sub-charger 62 supplied with the electric power from the sub-electric power receiving connector 61.

Moreover, as illustrated in FIG. 2, the electric circuit of the sub-mobility device 50 includes a control system including a sub-electric power monitor 71, a sub-electric power controller 72, a sub-GPS (global positioning system) receiver 73, a sub-input unit 74, a sub-communication unit 75, a sub-display 76, a sub-sensor 77, a sub-route generator 78, and a sub-automatic driving unit 79. The sub-electric power controller 72, the sub-route generator 78, and the sub-automatic driving unit 79 may be implemented when a CPU (central processing unit) 80 executes a program. This control system may receive the electric power from the sub-converter 64, as part of the above-described sub-facility equipment 68.

The sub-electric power monitor 71 monitors conditions of the sub-battery 63. The conditions of the sub-battery 63 include, for example, a charging voltage and a temperature. The sub-electric power controller 72 controls the sub-charger 62 and the sub-convertor 64, based on information from the sub-electric power monitor 71. For example, when the power cord is coupled to the sub-electric power receiving connector 61, and therefore the sub-charger 62 can charge the sub-battery 63, the sub-electric power controller 72 controls the charging of the sub-charger 62 until the voltage of the sub-battery 63 becomes a predetermined maximum voltage. When the voltage of the sub-battery 63 is lower than a predetermined minimum voltage, the sub-electric power controller 72 causes the sub-convertor 64 to stop the electric power conversion. In addition, when the voltage of the sub-battery 63 is equal to or lower than a voltage a little higher than the predetermined minimum voltage, the sub-electric power controller 72 causes the sub-converter 64 to reduce the electric power to be supplied to each of the loading devices. The sub-electric power controller 72 appropriately or periodically informs the sub-route generator 78 and the sub-automatic driving unit 79 of these power control states and the condition of the sub-battery 63.

The sub-GPS receiver 73 receives a radio wave from a GPS satellite. By receiving radio waves from a plurality of GPS satellites, it is possible to calculate the position of the sub-mobility device 50. The sub-input unit 74 is a device configured to receive the input operation of the passenger, and includes, for example, the above-described control lever 54. The sub-communication unit 75 communicates with a different device, such as a main communication unit 35 of an automobile 1 to transmit and receive data. In addition, the sub-communication unit 75 communicates with a base station, and therefore can acquire information on the position of the base station. The sub-display 76 is, for example, a liquid crystal device with touch panel. This touch panel may function as part of the sub-input unit 74. The sub-sensor 77 is configured to detect the position, the speed, and the surrounding environment of the sub-mobility device 50. The sub-route generator 78 receives, for example, a destination, and therefore generates a traveling route from the present position to the destination of the sub-mobility device 50. The sub-automatic driving unit 79 outputs control signals to the sub-drive motor 65, the sub-braking motor 66 and sub-steering motor 67, according to, for example, the generated traveling route. By this means, the sub-mobility device 50 can automatically move to the destination along the traveling route.

Here, to realize a society where the sub-mobility device 50 becomes widespread, and therefore people having difficulty walking by themselves are easy to live active lives, it is desired that the sub-mobility device 50 is used by not only people having difficulty walking by themselves but also people who can walk by themselves. Therefore, it is important that the sub-mobility device 50 can get in a vehicle such as the automobile 1 while a passenger sits in the sub-mobility device 50. In addition, when the sub-mobility device 50 is carried in the automobile 1, it is preferred that the sub-mobility device 50 can be charged in the automobile 1. By this means, even when a passenger gets in the sub-mobility device 50 insufficiently charged and starts to travel, it is possible to charge the sub-mobility device 50 in the automobile 1. Then, after getting out of the automobile 1, the passenger sitting in the sub-mobility device 50 sufficiently charged can move to a destination, and move around in the destination. With this additional value, a next-generation transportation system with organically combined sub-mobility and vehicle becomes more convenient, and therefore increased use of the sub-mobility device 50 is expected.

Here, when one automobile 1 carries a plurality of sub-mobility devices 50 and moves to a destination or a stop-off point near the destination, there may be an issue with the position of each of the sub-mobility devices 50 in the automobile 1. For example, the sub-mobility device 50 located far from the exit cannot get out of the automobile 1 unless a way to the exit is made by moving the other sub-mobility devices 50, for example, by getting the other sub-mobility devices 50 out of the automobile 1. In addition, when the sub-mobility device 50 whose passenger wants to drive the automobile 1 is located far from the driving position of the automobile 1, the sub-mobility device 50 cannot get to the driving position to drive the automobile 1 unless a way to the driving position is made by moving the other sub-mobility devices 50. Moreover, there may be a case where the passengers in the plurality of sub-mobility devices 50, as members of a group, want to get in the automobile 1 in the group. Furthermore, there may be a case where a passenger does not want to be located next to the sub-mobility device 50 of an undesirable person.

In this way, the automobile 1 capable of carrying the plurality of sub-mobility devices 50 is required to appropriately adjust the positions of the plurality of sub-mobility devices 50 in the automobile 1.

Figure 3:
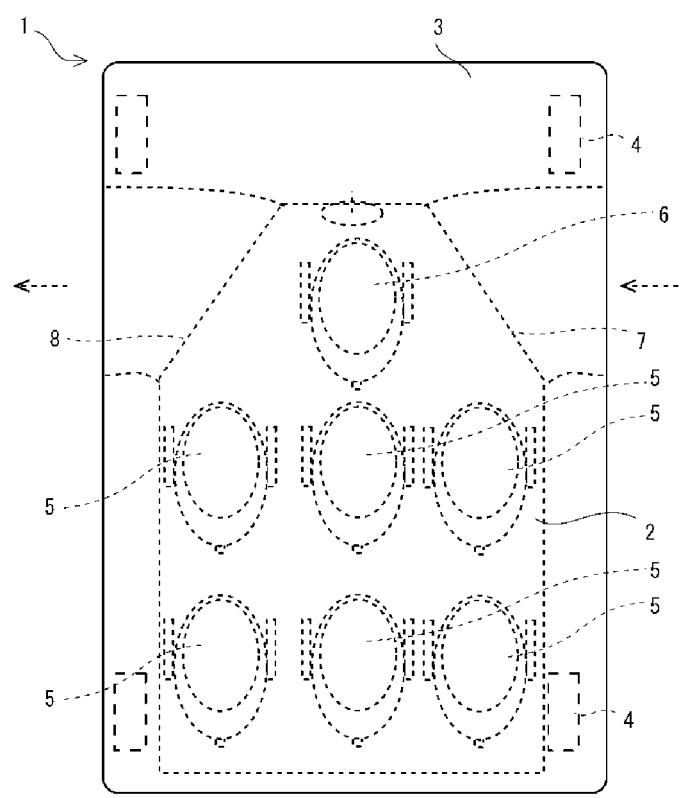
FIG. 3 is a schematic view illustrating an automobile according to an example of the present invention.

FIG. 3 is a schematic view illustrating the automobile 1 according to an example of the present invention. The automobile 1 illustrated in FIG. 3 includes a vehicle body 3 having a vehicle compartment 2, and wheels 4 provided on the lower part of the vehicle body 3. Six sub-mobility devices 50 arranged in two rows each of which includes three sub-mobility devices 50 can be carried in the vehicle compartment 2 at seat positions 5. In addition, a driving position 6 is located in front of the seat positions 5. Operating members such as a handle of the automobile 1 operated by a passenger are disposed around the driving position 6. The sub-mobility devices 50 may be fixed on the floor surface of the vehicle body 3 at the seat positions 5 or the driving position 6 by, for example, tire stoppers. In addition, in the automobile 1 illustrated in FIG. 3, an entrance 7 and an exit 8 are provided in the front part of the vehicle body 3 on the right side and the left side, respectively. Then, the sub-mobility devices 50 can get in the vehicle compartment 2 from the entrance 7 while the passengers sit in the sub-mobility devices 50. Then, the sub-mobility devices 50 can move to the seat positions 5 or the driving position 6 in the vehicle compartment 2. Moreover, the sub-mobility devices 50 can get out of the automobile 1 from the exit 8 while the passengers sit in the sub-mobility devices 50.

In this automobile 1, the sub-mobility devices 50 arranged in the front row or the back row can move to the seat positions in the other row. The sub-mobility devices 50 at the seat positions 5 in the front row can move directly to the driving position 6, but the sub-mobility devices 50 at the seat positions 5 in the back row cannot move directly to the driving position 6. In addition, the sub-mobility device 50 at the seat position 5 on the left in the front row, and the sub-mobility device 50 at the driving position 6 can move directly to the exit 8. Moreover, when there is no sub-mobility device 50 in the driving position 6, all the sub-mobility devices 50 in the seat positions 5 in the front row can move directly to the exit 8. In contrast, all the sub-mobility devices 50 in the seat positions 5 in the back row cannot move directly to the exit 8. In addition, the seat positions 5 are arranged in three columns, and therefore the seat positions 5 in the left column are not directly next to the seat positions 5 in the right column. Here, although all the sub-mobility devices 50 in the seat positions 5 are carried to face forward, the sub-mobility devices 50 may be carried to face backward. In addition, the sub-mobility devices 50 in the front row and the sub-mobility devices 50 in the back row may face each other, or the sub-mobility devices 30 in the back row may face backward. In this way, it is possible to provide a variety of arrangement patterns of the sub-mobility devices 50 in the vehicle compartment 2.

Figure 4:
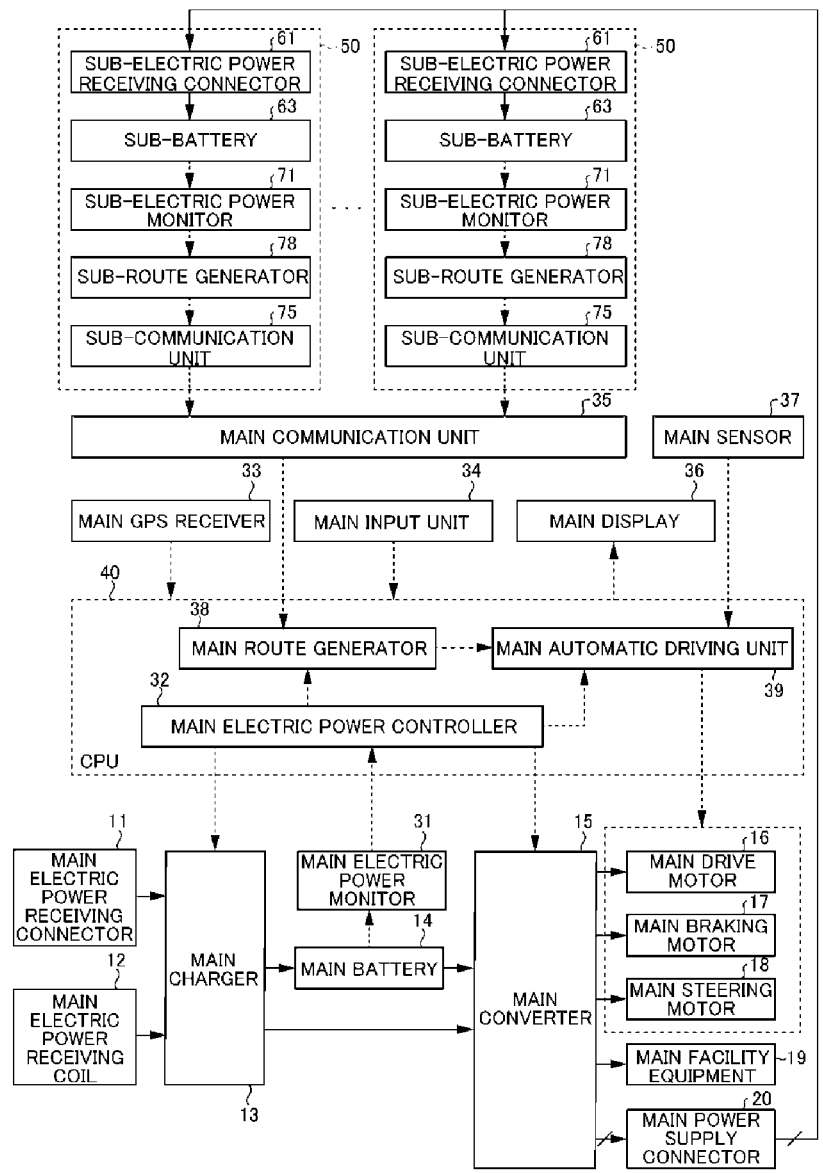
FIG. 4 illustrates an exemplary electric circuit of the automobile illustrated in FIG. 3.

FIG. 4 illustrates an exemplary electric circuit of the automobile 1 illustrated in FIG. 3. The automobile 1 is an example of vehicle. As illustrated in FIG. 4, the electric circuit of the automobile 1 illustrated in FIG. 3 includes an electric power system including a main electric power receiving connector 11, the main electric power receiving coil 12, a main charger 13, the main battery 14, a main converter 15, a main drive motor 16 for driving the plurality of wheels 4, a main braking motor 17, a main steering motor 18, a main facility equipment 19, and a main electric power supply connector 20.

The main electric power receiving connector 11 is used when the automobile 1 is parked, and coupled to, for example, a commercial electric power supply by a power cord. Electric power is supplied from the main electric power receiving coil 12 or the main electric power receiving connector 11 to the main charger 13, so that the main charger 13 charges the main battery 14. The main converter 15 converts the electric power stored in the main battery 14, and supplies the converted electric power to loading devices such as the main drive motor 16, the main braking motor 17, the main steering motor 18, the main facility equipment 19 and the main electric power supply connector 20. The main converter 15 supplies the electric power supplied to the main electric power receiving connector 11 and the main electric power receiving coil 12, or the electric power stored in the main battery 14, to the main electric power supply connector 20. The main electric power supply connector 20 is coupled to the sub-electric power receiving connector 61 of the sub-mobility device 50 carried in the automobile 1 by, for example, a power cord. The main electric power supply connector 20 is used to supply the electric power from the automobile 1 to the sub-mobility devices 50 carried in the automobile 1. The main drive motor 16 is driven to rotate the plurality of wheels 4, so that the automobile 1 can move forward or backward. The main steering motor 18 is driven to turn the wheels 4, so that the automobile 1 can turn to the right or the left. The main-braking motor 17 is driven to stop the rotation of the plurality of wheels 4, so that the automobile 1 can be stopped. In this way, the automobile 1 can run carrying the sub-mobility devices 50, by using the electric power stored in the main battery 14 charged by the main charger 13 supplied with the electric power from the main electric power receiving coil 12 or the main electric power receiving connector 11.

In addition, as illustrated in FIG. 4, the electric circuit of the automobile 1 includes a control system including a main electric power monitor 31, a main electric power controller 32, a main GPS receiver 33, a main input unit 34, a main communication unit 35, a main display 36, a main sensor 37, a main route generator 38, and a main automatic driving unit 39. The main electric power controller 32, the main route generator 38, and the main automatic driving unit 39 may be implemented when a CPU 40 as a controller executes a program. The CPU 40 may be provided in the automobile 1 as an ECU. As part of the above-described main facility equipment 19, each of these components of the control system may be supplied with electric power from the main converter 15.

The main electric power monitor 31 monitors conditions of the main battery 14. The conditions of the main battery 14 include, for example, a charging voltage and a temperature. The main electric power controller 32 controls the main charger 13 and the main convertor 15, based on information from the main electric power monitor 31. The main electric power controller 32 controls to supply electric power from the main converter 15 to the sub-mobility devices 50 via the main electric power supply connector 20. For example, when the power cord is coupled to the main electric power receiving connector 11, and therefore the main charger 13 can charge the main battery 14, the main electric power controller 32 controls the charging of the main charger 13 until the voltage of the main battery 14 becomes a predetermined maximum voltage.

The main GPS receiver 33 receives a radio wave from GPS satellite. By receiving radio waves from a plurality of GPS satellites, it is possible to calculate the position of the automobile 1. Here, the main GPS receiver 33 may receive, for example, other radio waves, and acquire a corrected position of the automobile 1 based on the radio waves. The main input unit 34 is a device configured to receive the input operation of the passenger. The main communication unit 35 communicates with other devices, for example, the sub-communication unit 75 of the sub-mobility device 50 to transmit and receive data. In addition, the main communication unit 35 communicates with the base station, and therefore can acquire information on the position of the base station. The main display 36 is, for example, a liquid crystal device with touch panel. This touch panel may function as part of the main input unit 34. The liquid crystal device with touch panel is disposed on, for example, the front surface of the vehicle compartment 2. By this means, the passengers in the plurality of sub-mobility devices 50 can view the same display. The main sensor 37 is configured to detect the position, the speed, and the surrounding environment of the automobile 1. The main route generator 38 receives, for example, a destination, and therefore generates a traveling route from the present position to a stop-off point of the automobile 1. The stop-off point may be the same as the destination, or a position near the destination where the automobile 1 can be parked. The main automatic driving unit 39 outputs control signals to the main drive motor 16, the main braking motor 17 and the main steering motor 18, according to, for example, the generated traveling route. By this means, the automobile 1 can automatically move to the destination along the traveling route.

Figure 5:
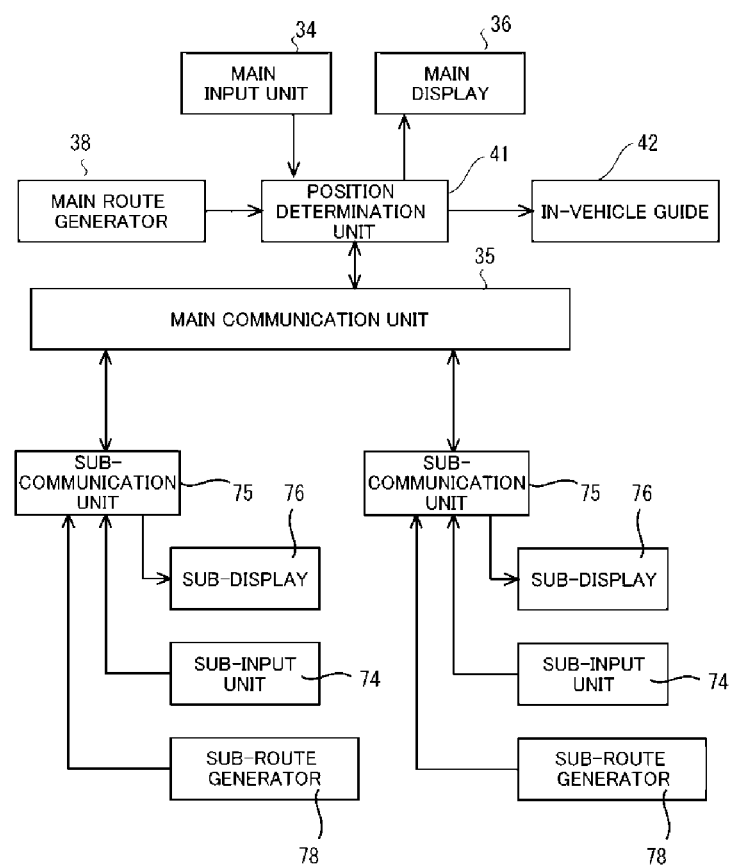
FIG. 5 illustrates a circuit to determine and control allocation of the positions of a plurality of sub-mobility devices in a vehicle compartment.

FIG. 5 illustrates a circuit to determine and control allocation of the positions of the plurality of sub-mobility devices 50 in the vehicle compartment 2. FIG. 5 illustrates a control circuit of the automobile 1 including the main input unit 34, the main display 36, the main route generator 38, a position determination unit 41, an in-vehicle guide 42 and the main communication unit 35. In addition, FIG. 5 illustrates, for each of the sub-mobility devices 50, a circuit including the sub-communication unit 75, the sub-display 76, the sub-input unit 74, and the sub-route generator 78.

The main route generator 38 generates a traveling route to pass through destinations or stop-off points near the destinations of the plurality of sub-mobility devices 50 in sequence, based on information on the destinations acquired from the main input unit 34 or the plurality of sub-mobility devices 50. In this case, the main route generator 38 may cause the main communication unit 35 and the sub-communication units 75 to automatically communicate with each another to acquire a condition of the sub-mobility device 50 from each of the sub-mobility devices 50. The position determination unit 41 determines the seat positions of the plurality of sub-mobility devices 50 such that the seat position 5 closer to the exit 8 is allocated to the sub-mobility device 50 scheduled to get out of the automobile 1 earlier, based on the generated traveling route and the destinations of the plurality of sub-mobility devices 50. In addition, the position determination unit 41 causes the main display 36 and a plurality of sub-displays 76 to display the determined allocation of the seat positions 5. The in-vehicle guide 42 causes the main display 36 and the plurality of sub-displays 76 to display a procedure of moving in the vehicle compartment 2 for the plurality of sub-mobility devices 50 to get to the allocated seat positions 5. Here, the plurality of sub-mobility devices 50 may be moved by the in-vehicle guide 42.

Figure 6:
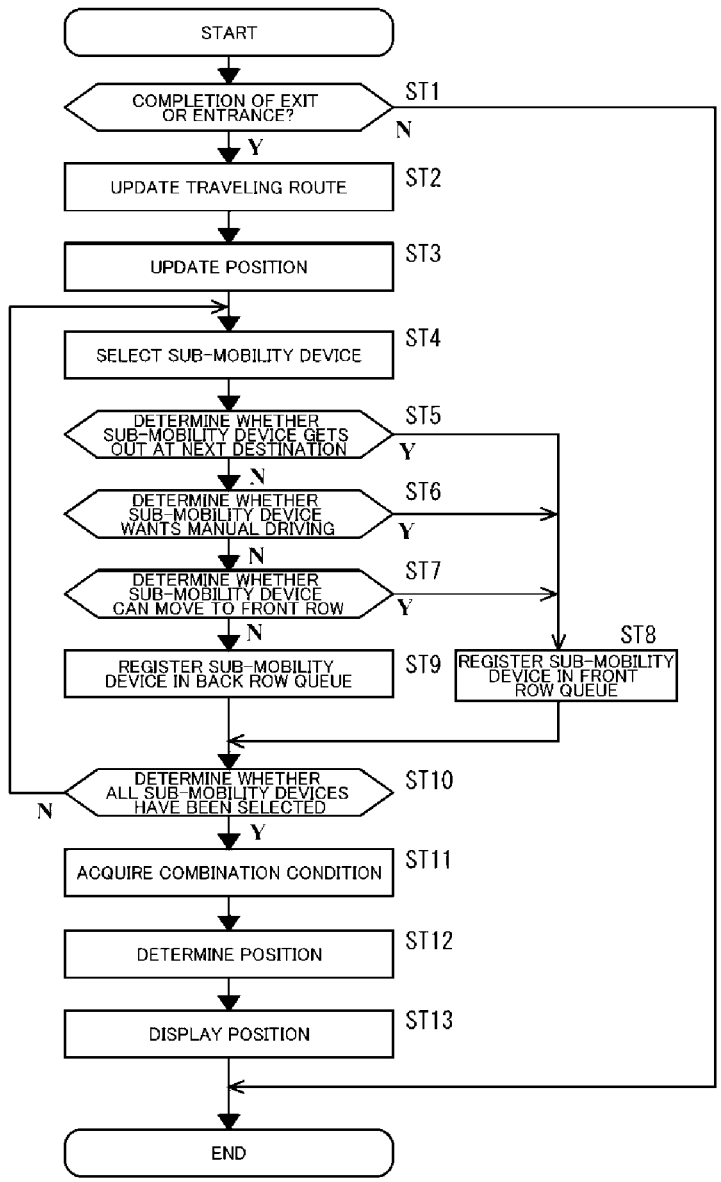
FIG. 6 is a flowchart illustrating a process of allocating the positions of the sub-mobility devices in the vehicle compartment which is performed by a position determination unit and so forth.

FIG. 6 is a flowchart illustrating a process of allocating the positions of the sub-mobility devices 50 in the vehicle compartment 2 performed by, for example, the position determination unit 41. When the sub-mobility device 50 gets out of the automobile 1, or a new sub-mobility device 50 gets in the automobile 1, the position determination unit 41 performs the process illustrated in FIG. 6. Here, for example, when the destination of the sub-mobility device 50 in the automobile 1 is changed, the position determination unit 41 may perform the process illustrated in FIG. 6.

As illustrated in FIG. 6, the position determination unit 41 checks if the sub-mobility device 50 has gotten out of the automobile 1, or the new sub-mobility device 50 has gotten in the automobile 1 (step ST1). After that, the position determination unit 41 commands the main route generator 38 to generate a new traveling route. The main route generator 38 acquires the destination of the new sub-mobility device 50, which has been inputted to the new sub-mobility device 50, and, using this destination with the destinations of the other sub-mobility devices 50 which have been acquired, generates the new traveling route to pass through these destinations or the stop-off points near the destinations. By this means, the position determination unit 41 updates the traveling route (step ST2).

After the traveling route is updated, the position determination unit 41 starts a step of updating the positions of the plurality of sub-mobility devices 50 in the vehicle compartment 2 (step ST3). First, the position determination unit 41 selects one of the sub-mobility devices 50 (step ST14), and determines the condition of this sub-mobility device 50. To be more specific, the position determination unit 41 determines whether the selected sub-mobility device 50 gets out of the automobile 1 at the next destination or stop-off point, based on the destination of the sub-mobility device 50 (step ST5). When determining that the sub-mobility device 50 gets out of the automobile 1, the position determination unit 41 registers the sub-mobility device 50 in a front row queue (step ST8). In addition, the position determination unit 41 determines whether the sub-mobility device 50 can or wants to manually drive the automobile 1, based on information on the property of the passenger of the selected sub-mobility device 50, or information on whether the passenger wants to manually drive the automobile 1 (step ST6). When determining that the passenger of the sub-mobility device 50 can or wants to manually drive the automobile 1, the position determination unit 41 registers the sub-mobility device 50 in the front row queue (step ST8). In addition, the position determination unit 41 determines whether the sub-mobility device 50 can move to the front row, based on information on the present seat position 5 of the sub-mobility device 50 (step ST7). When determining that the sub-mobility device 50 can move to the front row, the position determination unit 41 registers the sub-mobility device 50 in the front row queue (step ST8). When determining as negative in the step ST6 and the step ST7, the position determination unit 41 registers the sub-mobility device 50 in a back row queue (step ST9). Here, the front row queue corresponds to the seat positions 5 in the front row, and the back row queue correspond to the seat positions 5 in the back row in FIG. 3. However, for each of the rows, the number of the sub-mobility devices 50 registered may be greater than the number of the seat positions 5. Next, the position determination unit 41 determines whether all the sub-mobility devices 50 have been selected (step ST10). When determining that the selection is not completed, the position determination unit 41 repeats the process from the step of selection (ST4) to the step of registration in the queue (ST8 or ST9).

When determining that all the sub-mobility devices 50 have been selected, the position determination unit 41 acquires a combination condition for the seat positions from all the sub-mobility devices 50 (step ST11). The combination condition includes, for example, group information, and information on a next seat availability.

Then, the position determination unit 41 determines the seat positions 5 of the plurality of sub-mobility devices 50 in the vehicle compartment 2, based on the order of getting out of the automobile 1, the front row queue, the back row queue, and the combination condition (step ST12). For example, the seat position 5 on the left in the front row is allocated to the sub-mobility device 50 registered in the front row queue, which is scheduled to get out of the automobile 1 at the next destination. In this case, the position determination unit 41 takes into account the combination condition of the positions of the sub-mobility devices 50 in the vehicle compartment 2, and allocates the seat position 5 to which the sub-mobility device 50 easily move from the present seat position 5. In addition, when there is no passenger who can manually drive the automobile 1 in the front row as a result of the allocation, the position determination unit 41 exchanges at least one of the sub-mobility devices 50 in the seat positions 5 in the front row for the sub-mobility device 50 whose passenger can manually drive the automobile 1. As a result, for the sub-mobility device 50 which is scheduled to get out of the automobile 1 at the next destination but removed from the front row, the position determination unit 41 allocates the seat position 5 behind the position of the sub-mobility device 50 in the front row which will get out of the automobile 1. In addition, for the sub-mobility devices 50 in the back row queue, the empty seat positions 5 in the back row or the front row are allocated in order from the left or the front. In this case, the position determination unit 41 allocates the seat positions 5 to the sub-mobility devices 50 such that the sub-mobility devices 50 are arranged from the left to the right according to the order of getting out of the automobile 1 at the subsequent destinations as possible. Here, basically, the position determination unit 41 allocates the seat positions 5 to all the sub-mobility devices 50 in the vehicle compartment 2. However, when the seventh sub-mobility device 50 gets in the automobile 1, the position determination unit 41 may allocate the driving position 6 to the sub-mobility device 50. In this case, the position determination unit 41 may allocate the driving position 6 to the sub-mobility device 50 whose passenger can manually drive the automobile 1 and which is scheduled to get out of the automobile 1 at the next destination. By this means, the position determination unit 41 determines the seat positions 5 of the plurality of sub-mobility devices 50 in the vehicle compartment 2.

Next, the position determination unit 41 causes the main display 36 and the plurality of sub-displays 76 to display the determined seat positions 5 of the plurality of sub-mobility devices 50 (step ST13). The passengers in the sub-mobility devices 50 move the sub-mobility devices 50 to the determined seat positions 5 based on the displays. The movement of each of the sub-mobility devices 50 is controlled or guided based on the determination of the position determination unit 41. Here, when the sub-mobility devices 50 move to the seat positions 5, the movement courses of the plurality of sub-mobility devices 50 are likely to conflict with each other. In this case, in order to allow the plurality of sub-mobility devices 50 to get to the determined seat positions 5, the in-vehicle guide 42 may cause the main display 33 and the plurality of sub-displays 76 to display the procedure of moving in the vehicle compartment 2 for the plurality of sub-mobility devices 50.

As described above, with the present example, the position determination unit 41 determines the positions (seat positions 5) of the plurality of sub-mobility devices 50 in the vehicle compartment 2, based on a combination of the conditions including the order of getting out of the automobile 1, a possibility of manual driving, and the position in the vehicle compartment 2, for each of the plurality of sub-mobility devices 50. Therefore, it is possible to arrange the plurality of sub-mobility devices 50 in the vehicle compartment 2, in order to prevent a problem in getting out of the automobile 1, allow the manual driving, or satisfy the desired condition of each of the sub-mobility devices 50.

With the present example, the exit 8 is provided separately from the entrance 7. Then, the position determination unit 41 determines the positions of the plurality of sub-mobility devices 50 in the vehicle compartment 2 such that the sub-mobility devices 50 can move to the exit 8 according to the order of getting out of the automobile 1 from the exit 8. By this means, when one of the sub-mobility devices 50 gets out of the automobile 1, the remaining sub-mobility devices 50 which are not scheduled to get out of the automobile 1 do not need to get out of the automobile 1.

With the present example, the vehicle compartment 2 has the driving position 6 where the passenger sitting in the sub-mobility device 50 can manually drive the automobile 1, and the seat positions 5 where the passengers simply sit in the sub-mobility devices 50. For the sub-mobility device 50 whose passenger wants the manual driving, the position determination unit 41 preferentially allocates the driving position 6, or the seat position 5 from which the sub-mobility device 50 can move to the driving position 6. Accordingly, it is possible to appropriately dispose the sub-mobility device 50 whose passenger wants the manual driving in the driving position 6, and therefore to allow the passenger to manually drive the automobile 1.

With the present example, the vehicle compartment 2 has the driving position 6 where the passenger sitting in the sub-mobility device 50 can manually drive the automobile 1, and the seat positions where the passengers simply sit in the sub-mobility devices 50. For the sub-mobility device 50 of at least one passenger who can manually drive the automobile 1, the position determination unit 41 allocates the driving position 6, or the seat position 5 from which the sub-mobility device 50 can move to the driving position 6. Accordingly, when it is necessary to manually drive the automobile 1, it is possible to dispose the sub-mobility device 50 whose passenger can manually drive the automobile 1 in the driving position 6, and therefore to allow the passenger to manually drive the automobile 1.

With the present example, the vehicle compartment 2 has the exit 8 to which the sub-mobility device 50 in the driving position 6 and the sub-mobility device in one seat position 5 can move directly, and the position determination unit 41 allocates the driving position 6 or the one seat position 5 to the sub-mobility device 50 scheduled to get out of the automobile 1 at the next drop-off point. Therefore, when the sub-mobility device 50 gets out of the automobile 1 at the next drop-off point, the remaining sub-mobility devices 50 which are not scheduled to get out of the automobile 1 do not need to get out of the automobile 1.

With the present example, after the new sub-mobility device 50 gets in the automobile 1, the position determination unit 41 updates the positions of the plurality of sub-mobility devices 50 in the vehicle compartment 2. Therefore, it is possible to arrange the sub-mobility devices 50 in the vehicle compartment 2 to always prevent a problem in getting out of the automobile 1 next.

With the present example, when the new sub-mobility device 50 gets in the automobile 1, the position determination unit 41 updates the traveling route to pass through the destinations or the stop-off points near the destinations of the plurality of sub-mobility devices 50. Then, when updating the traveling route, the position determination unit 41 updates the positions of the plurality of sub-mobility devices 50 to the positions to which the sub-mobility devices 50 can move from the last positions. Therefore, it is possible to appropriately maintain the positions of the plurality of sub-mobility devices 50 in the vehicle compartment 2 according to the order of getting out of the automobile 1 as possible.

While the above-described examples are preferred examples of the present invention, it is to be understood that the invention is not limited to these examples. The present invention is intended to cover various modification and alteration without departing from the spirit and scope of the present invention.

With the above-described example, the movement of each of the sub-mobility devices 50 in the vehicle compartment 2 is controlled or guided by the passengers sitting in the sub-mobility devices 50, based on the displays. In addition, for example, the movement of the sub-mobility devices 50 may be automatically controlled by themselves.

The invention claimed is:

1. A vehicle comprising:
   a display device;
   a controller configured to cause the vehicle to move to destinations along a traveling route; and
   a vehicle compartment configured to lade the vehicle with sub-mobility devices in which a passenger sits, the vehicle compartment including a floor configured to fix the sub-mobility devices at positions including:
      a driving position that has a handle of the vehicle so as to manually drive the vehicle by a passenger sitting in one of the sub-mobility devices; and
      seat positions that are disposed around the driving position, the sub-mobility devices capable of moving to the seat positions and the driving position;
   an input device configured to obtain final destinations of the passenger by operating of the input device via the passenger or by communicating with the sub-mobility devices;
   wherein the controller includes:
      a processor; and
      a memory, the memory storing instructions to cause the processor to perform:
         acquiring, from each of the sub-mobility devices, via the input device, conditions including the final destinations and positions of the sub-mobility devices fixed on the floor of in the vehicle compartment;
         generating the traveling route to pass through at least the final destinations of the sub-mobility devices on a basis of the final destinations;
         determining, on a basis of the traveling route, new positions of the sub-mobility devices by assigning the sub-mobility devices to the seat positions nearest to an entrance of the vehicle according to an order in which the sub-mobility devices gets off the vehicle;
         determining, on a basis of the traveling route, new positions of the sub-mobility devices by assigning the sub-mobility devices in which passengers capable of driving the vehicle sit to the driving position or the seat positions with an ability to move to the driving position; and
         displaying, on display sub-devices of the sub-mobility devices, a procedure of moving the sub-mobility devices in the vehicle compartment to get to the new positions, the procedure preventing the sub-mobility devices from conflict among movement courses of the sub-mobility devices to the new positions.

2. The vehicle according to claim 1, wherein movement of each of the sub-mobility devices in the vehicle compartment is controlled or guided on a basis of the determining new positions, and
   wherein the new positions prevent the problem in getting out of the vehicle at the final destinations.

3. The vehicle according to claim 2, further comprising:
   an exit provided separately from an entrance from which the sub-mobility devices get in the vehicle,
   wherein the determining new positions determines the positions of the sub-mobility devices in the vehicle compartment such that the sub-mobility devices can move to the exit according to the order of getting out of the vehicle from the exit.

4. The vehicle according to claim 3, wherein after a new sub-mobility device gets in the vehicle, the memory further storing instructions to cause the processor to update the positions of the sub-mobility devices in the vehicle compartment.

5. The vehicle according to claim 4, further comprising:
   a main route generator configured to update a traveling route to pass through destinations or step-off points near the destinations of the sub-mobility devices in the vehicle compartment when the new sub-mobility device gets in the vehicle,
   wherein when the traveling route is updated because the new sub-mobility device gets in the vehicle, the memory further storing instructions to cause the processor to update the positions of the sub-mobility devices to positions to which the sub-mobility devices can move from last positions.

6. The vehicle according to claim 2, wherein:
   the vehicle compartment has a driving position where a passenger sitting in a sub-mobility device has the capability of manually driving the vehicle, and seat positions where the passengers sit in the sub-mobility devices; and
   for the sub-mobility device whose passenger wants to manually drive the vehicle, the memory further storing instructions to cause the processor to allocate the driving position, or a seat position from which the sub-mobility device can move to the driving position.

7. The vehicle according to claim 6, wherein:
   the vehicle compartment comprises an exit to which the sub-mobility device in the driving position and the sub-mobility device in one of the seat positions can move directly; and
   the memory further storing instructions to cause the processor to allocate the driving position or the one seat position to the sub-mobility device scheduled to get out of the vehicle at a next drop-off point.

8. The vehicle according to claim 2, wherein:
   the vehicle compartment has a driving position where a passenger sitting in a sub-mobility device can manually drive the vehicle, and seat positions where passengers simply sit in the sub-mobility devices; and
   for the sub-mobility device of at least one passenger who has the capability of manually driving the vehicle, the memory further storing instructions to cause the processor to allocate the driving position, or a seat position from which the sub-mobility device can move to the driving position.

9. The vehicle according to claim 8, wherein:
   the vehicle compartment comprises an exit to which the sub-mobility device in the driving position and the sub-mobility device in one of the seat positions can move directly; and
   the memory further storing instructions to cause the processor to allocate the driving position or the one seat position to the sub-mobility device scheduled to get out of the vehicle at a next drop-off point.

10. The vehicle according to claim 2, wherein after a new sub-mobility device gets in the vehicle, the memory further storing instructions to cause the processor to update the positions of the sub-mobility devices in the vehicle compartment, and
    wherein the displaying displays the movement of each of the sub-mobility devices with respect to each other.

11. The vehicle according to claim 10, further comprising:
    a main route generator configured to update a traveling route to pass through destinations or step-off points near the destinations of the sub-mobility devices in the vehicle compartment when the new sub-mobility device gets in the vehicle, wherein when the traveling route is updated because the new sub-mobility device gets in the vehicle, the memory further storing instructions to cause the processor to update the positions of the sub-mobility devices to positions to which the sub-mobility devices can move from last positions.

12. The vehicle according to claim 1, further comprising:
an exit provided separately from an entrance from which the sub-mobility devices get in the vehicle, wherein the determining new positions determines the positions of the sub-mobility devices in the vehicle compartment such that the sub-mobility devices can move to the exit according to the order of getting out of the vehicle from the exit.

13. The vehicle according to claim 12, wherein after a new sub-mobility device gets in the vehicle, the memory further storing instructions to cause the processor to update the positions of the sub-mobility devices in the vehicle compartment.

14. The vehicle according to claim 13, further comprising:
a main route generator configured to update a traveling route to pass through destinations or step-off points near the destinations of the sub-mobility devices in the vehicle compartment when the new sub-mobility device gets in the vehicle, wherein when the traveling route is updated because the new sub-mobility device gets in the vehicle, the memory further storing instructions to cause the processor to update the positions of the sub-mobility devices to positions to which the sub-mobility devices can move from last positions.

15. The vehicle according to claim 1, wherein:
the vehicle compartment has a driving position where a passenger sitting in a sub-mobility device has the capability of manually driving the vehicle, and seat positions where the passengers sit in the sub-mobility devices; and for the sub-mobility device whose passenger wants to manually drive the vehicle, the memory further storing instructions to cause the processor to allocate the driving position, or a seat position from which the sub-mobility device can move to the driving position.

16. The vehicle according to claim 15, wherein:
the vehicle compartment comprises an exit to which the sub-mobility device in the driving position and the sub-mobility device in one of the seat positions can move directly; and the memory further storing instructions to cause the processor to allocate the driving position or the one seat position to the sub-mobility device scheduled to get out of the vehicle at a next drop-off point.

17. The vehicle according to claim 1, wherein:
the vehicle compartment has a driving position where a passenger sitting in a sub-mobility device can manually drive the vehicle, and seat positions where passengers simply sit in the sub-mobility devices; and for the sub-mobility device of at least one passenger who has the capability of manually driving the vehicle, the memory further storing instructions to cause the processor to allocate the driving position, or a seat position from which the sub-mobility device can move to the driving position.

18. The vehicle according to claim 17, wherein:
the vehicle compartment comprises an exit to which the sub-mobility device in the driving position and the sub-mobility device in one of the seat positions can move directly; and the memory further storing instructions to cause the processor to allocate the driving position or the one seat position to the sub-mobility device scheduled to get out of the vehicle at a next drop-off point.

19. The vehicle according to claim 1, further comprising:
a main route generator configured to update a traveling route to pass through destinations or step-off points near the destinations of the sub-mobility devices in the vehicle compartment when the new sub-mobility device gets in the vehicle, wherein when the traveling route is updated because the new sub-mobility device gets in the vehicle, the memory further storing instructions to cause the processor to update the positions of the sub-mobility devices to positions to which the sub-mobility devices can move from last positions.

20. The vehicle according to claim 1, wherein when a new sub-mobility device gets in the vehicle, the instructions cause the process to perform:

acquiring, via the input device, conditions including a final destination of the new sub-mobility device;

generating a new traveling route to pass through at least final destinations of all sub-mobility devices in the vehicle compartment, the all sub-mobility devices including the new sub-mobility device;

determining update positions of the all sub-mobility devices in the vehicle compartment on a basis of the new traveling route including an order of getting out of the vehicle; and displaying a new procedure of moving the all sub-mobility devices in the vehicle compartment to get to the update positions on the display device.

* * * * *